United States Patent
Sanders et al.

(10) Patent No.: US 7,526,001 B2
(45) Date of Patent: Apr. 28, 2009

(54) STATISTICAL MULTIPLEXER HAVING PROTECTIVE FEATURES FROM EXTRANEOUS MESSAGES GENERATED BY REDUNDANT SYSTEM ELEMENTS

(75) Inventors: John Sanders, Ramona, CA (US); Erik J. Elstermann, Carlsbad, CA (US); Siu-Wai Wu, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 887 days.

(21) Appl. No.: 10/899,859

(22) Filed: Jul. 26, 2004

(65) Prior Publication Data

US 2006/0018254 A1 Jan. 26, 2006

(51) Int. Cl.
*H04J 3/24* (2006.01)
*H04J 3/14* (2006.01)
*G08C 15/00* (2006.01)

(52) U.S. Cl. .......................... 370/532; 370/537; 370/225

(58) Field of Classification Search .................. 370/217, 370/225, 227–228, 359, 463, 532, 537, 540; 725/138, 144, 146, 147
See application file for complete search history.

(56) References Cited

U.S. PATENT DOCUMENTS

| 5,216,503 | A | | 6/1993 | Paik et al. ..................... 358/133 |
|---|---|---|---|---|
| 5,506,844 | A | | 4/1996 | Rao ............................ 370/84 |
| 5,708,664 | A | | 1/1998 | Budge et al. ................. 370/538 |
| 6,002,687 | A | * | 12/1999 | Magee et al. ................ 370/394 |
| 6,038,256 | A | | 3/2000 | Linzer et al. ................. 375/240 |
| 6,167,084 | A | | 12/2000 | Wang et al. ............. 375/204.02 |
| 6,249,813 | B1 | * | 6/2001 | Campion et al. ............ 709/222 |
| 6,418,122 | B1 | | 7/2002 | Schoenblum et al. ....... 370/252 |
| 6,643,327 | B1 | | 11/2003 | Wang ..................... 375/240.12 |

(Continued)

FOREIGN PATENT DOCUMENTS

WO    WO 00/13419    3/2000

OTHER PUBLICATIONS

Boroczky, A.Y. et al., "Statistically Multiplexing Using MPEG-2 Video Encoders," IBM, 16 pages, published May 26, 1999.

(Continued)

*Primary Examiner*—Chi H Pham
*Assistant Examiner*—Warner Wong
(74) *Attorney, Agent, or Firm*—Larry T. Cullen

(57) ABSTRACT

A statistical multiplexer includes a plurality of primary encoders 120 and at least one backup encoder 130 which is activated a primary encoder fails. The statistical multiplexer also includes at least two multiplexers 140,160 such that at any given time one of the multiplexers 140,160 is in an active state and the other is in a backup state. The encoders 120, 130, the multiplexers 140, 160, and a rate processor 150 employ a dynamic identity allocation arrangement for identifying a source of the messages such that messages originating from the encoders 120, 130 indicate whether the source is a primary 120 or backup encoder 130 and messages originating from the multiplexers 140, 160 include a character selected from among a predetermined sequence of characters that is incremented to the next character in the sequence each time one of the multiplexers 140, 160 transitions between an active and a backup state.

23 Claims, 1 Drawing Sheet

U.S. PATENT DOCUMENTS

| | | | |
|---|---|---|---|
| 6,891,854 B2 * | 5/2005 | Zhang et al. | 370/468 |
| 7,281,024 B1 * | 10/2007 | Banerjee et al. | 707/204 |
| 7,333,515 B1 * | 2/2008 | Ramakrishnan et al. | 370/487 |
| 7,342,968 B2 * | 3/2008 | Balakrishnan et al. | 375/240.26 |
| 2002/0006140 A1 * | 1/2002 | Ihara | 370/503 |
| 2003/0174723 A1 * | 9/2003 | DeHon et al. | 370/404 |
| 2003/0235220 A1 | 12/2003 | Wu et al. | 370/535 |
| 2005/0226266 A1 * | 10/2005 | Enari et al. | 370/464 |
| 2007/0091857 A1 * | 4/2007 | Elstermann | 370/338 |
| 2007/0107029 A1 * | 5/2007 | Monroe et al. | 725/105 |

OTHER PUBLICATIONS

"Statistically Multiplexing/Remultiplexers: Xilinx Solutions For The Cable Headend", Emerging Standards & Protocols, XILINX, 28 pages, date unknown but before the filing date of the instant application.

"Statistical Multiplexing: Increased Efficiency, Flexibility, and Quality for MPEG-2 Video Applications," White Paper, http://www.cisco.com/warp/public/cc/pd/mxsv/rmux/produlit/smva_wp.htm, posted Aug. 27, 2002, 6 pages.

* cited by examiner

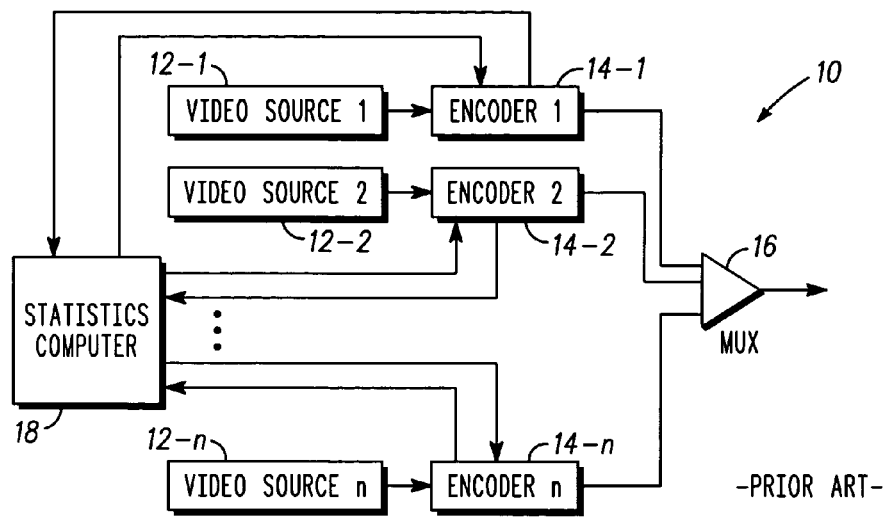
FIG. 1 -PRIOR ART-
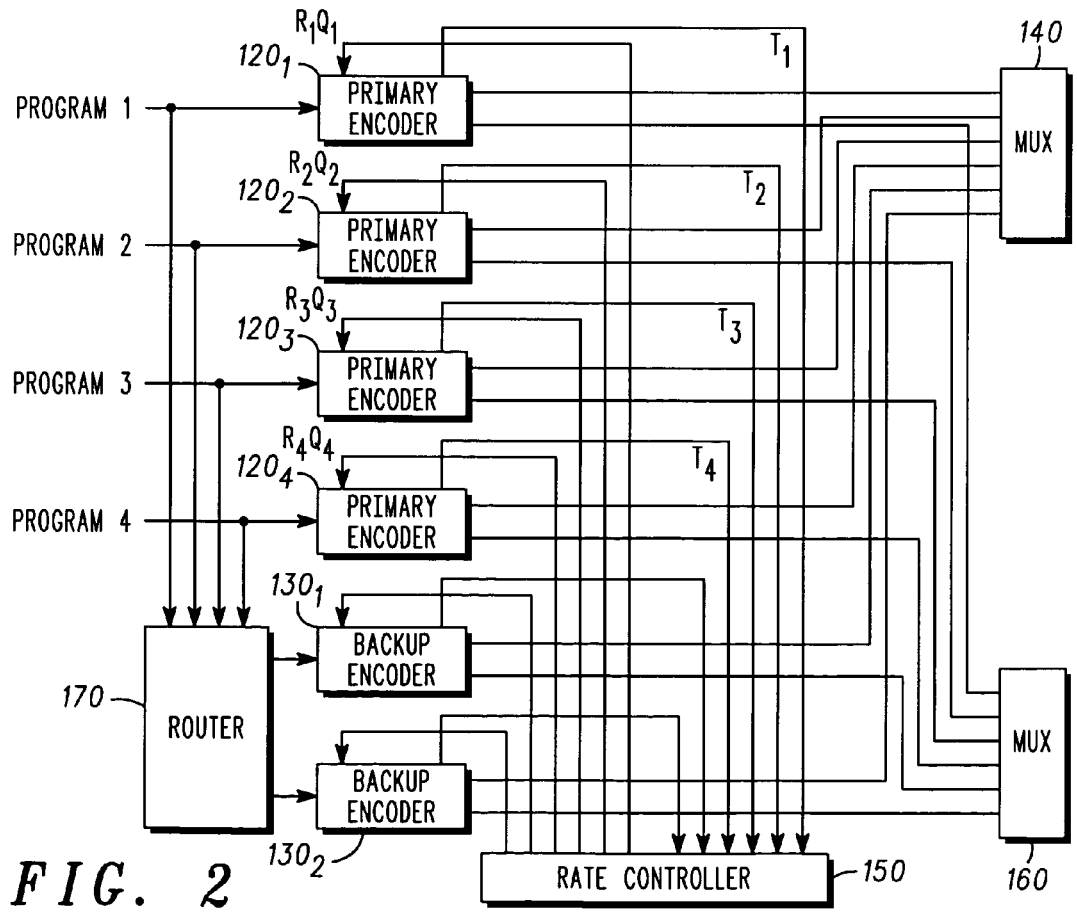
FIG. 2

STATISTICAL MULTIPLEXER HAVING PROTECTIVE FEATURES FROM EXTRANEOUS MESSAGES GENERATED BY REDUNDANT SYSTEM ELEMENTS

FIELD OF THE INVENTION

The present invention relates generally to statistical multiplexers for encoding digital video programs in a multi-program environment and more particularly to a statistical multiplexer in which redundancy is provided to increase reliability.

BACKGROUND OF THE INVENTION

With recent advances in digital data transmission techniques and digital video compression, such as used in the MPEG-2 standard, it is possible to deliver several digitally compressed video programs in the same bandwidth presently occupied by a single analog television (TV) channel. These capabilities provide opportunities for programming service providers (e.g., broadcasters such as CNN, ABC), network operators (e.g., cable and satellite network owners), and end users.

In a multi-program transmission environment, several programs (e.g., channels) are coded, multiplexed and transmitted over a single communication channel. Since these programs share a limited channel capacity, the aggregate bit rate of the programs must be no greater than the communication channel rate. Accordingly, many video encoding applications utilize statistical multiplexing techniques to combine several programs each comprising a compressed video bit stream into a single multiplexed bit stream, e.g., for transmission on a single channel. The bit rate of a given compressed stream generally varies with time based on the complexity of the corresponding video signals. A statistical multiplexer attempts to estimate the complexity of the various video frame sequences of a video signal and allocates channel bits among the corresponding compressed video bit streams so as to provide an approximately constant level of video quality across all of the multiplexed streams. For example, a given video frame sequence with a relatively large amount of spatial activity or motion may be more complex than other sequences and therefore allocated more bits than the other sequences.

An example of a statistical multiplexing encoding system is described in M. Perkins & D. Arnstein, Statistical Multiplexing of Multiple MPEG-2 Video Programs in a Single Channel, SMPTE J., vol. 104, no. 9, p. 596-599, September, 1995. As described in this reference, multiple encoders each receive a respective program, encode the program, and place their compressed picture data of a video signal of the program in a corresponding buffer of fixed size pending submission to a multiplexer. (As per MPEG-2 parlance, a "program" is a collection of one or more related signals. Herein, a program is presumed to include a video signal but may also include one or more associated audio signals, a close caption text signal, etc.) A multiplexer receives the encoded programs from the multiple encoders, in the form of a bit stream. A different bit rate may be assigned to each bit stream depending on a respective estimate of the number of bits needed by the video bit stream of the corresponding program to achieve the same level of quality as the other programs with which it is multiplexed. (Generally speaking, the bit rate of the video bit stream of a program is variable whereas the bit rates of the audio and other associated bit streams of a program are constant. This invention is illustrated in the context of adjusting only the bit rate of the video bit stream portion of a program.)

On the receiving end of the communication, a decoder receives the multiplexed multiple program bit stream and discards the data it does not need (e.g., if the decoder is a set top box, only the "tuned" or selected program is retained, whereas the data of each non-selected program is discarded). The retained data is inputted to the decoder's input buffer of a fixed size pending decoding. The removal of data from the decoder buffer for decoding is controlled in a strict fashion to affect a constant end-to-end delay for any selected program. In the statistical multiplexing encoding scheme, the relative timing of each to-be-multiplexed program is independent. A first encoder for a first program may have many pictures of compressed data in its buffer pending submission to the multiplexer while a second encoder for a second bit stream may have only a few pictures in its buffer pending submission to the multiplexer. A decoder that selects the first program for decoding will be receiving "earlier" pictures than a decoder that selects the second program for decoding. Such a variable delay is eliminated by each decoder lengthening or shortening the amount of time the received pictures spend in the decoder buffer pending decoding to effect the above-noted constant end-to-end delay.

FIG. 1 shows an example of a conventional statistical multiplexer 10. The statistical multiplexer 10 includes a number n of video sources 12-i, i=1, 2, ... n. Each of the n video sources 12-i supplies a video signal (e.g., a video bit stream) to a corresponding encoder 14-i. The encoders 14-i generate compressed video bit streams which are supplied to a multiplexer 16. The multiplexer 16 combines all of the compressed video bit streams into a single multiplexed bit stream. Each of the encoders 14-i sends statistics about the video bit stream that it is encoding to a statistics computer 18. The statistics computer 18 uses the statistics received from the encoders 14-i to determine a suitable allocation of available channel bits among the n video bit streams. The statistics computer 18 sends information regarding the allocated bit rate of each video bit stream to the corresponding encoders 14-i.

In some statistical multiplexers the encoders and multiplexer are duplicated to provide a degree of fault tolerance. Thus, if an encoder, for example, should fail, a backup encoder is available to take its place. Similarly, if the multiplexer should fail, it can be exchanged for a backup multiplexer that is ready to go online. For purposes of communication among the various components, each encoder and multiplexer is assigned an identifier. The identifiers may be assigned in a fixed or dynamic manner. If the identifiers are allocated in a fixed manner, each component has a unique identifier that does not change regardless of whether the component is on or off line. In dynamic allocation, on the other hand, if a given encoder should fail, the backup encoder that takes its place also takes its identifier. For example, if an encoder designated "encoder 1" should fail, the backup encoder will be designed "encoder 1" when it comes on line.

Dynamic identity allocation is often preferable to fixed identity allocation because it provides a greater degree of flexibility and, potentially, increased signaling efficiency. However, a problem could arise if a component falsely issues a message using the identity of another component under fault conditions. For example, if an encoder (or multiplexer) designated "encoder 1" should fail but continues to generate signals, both it and the backup encoder that takes its place may issue messages that appear to originate from "encoder 1."

Accordingly, it would be desirable to provide a statistical multiplexer having redundant encoders and multiplexers that uses dynamic identity allocation and avoids the aforementioned problem.

SUMMARY OF THE INVENTION

In accordance with the present invention, a statistical multiplexer is provided for multiplexing at least two bit streams, which each comprise video signals, into a single multiplexed encoded bit stream. The statistical multiplexer includes a plurality of primary encoders each receiving one of the bit streams and generating an encoded bit stream and at least one backup encoder that is activated and on-line in the event of a failure of one of the plurality of primary encoders. The backup encoder receives the bit stream that would otherwise be directed to the failed primary encoder. The statistical multiplexer also includes at least two multiplexers such that at any given time one of the multiplexers is in an active state and the other is in a backup state. The multiplexer in the active state receives each of the encoded bit streams from the encoders and generates a multiplexed encoded bit stream. The multiplexer in the backup state transitions to the active state and receives each of the encoded bit streams from the encoders in the event of a failure in the other multiplexer. A rate processor is provided for adjusting a distribution of bit rate allocation among the plurality of primary encoders. A communications channel is operatively associated with the encoders, the multiplexers and the rate processor. The communication channel supports messages among and between the encoders, the multiplexers and the rate processor. The encoders, the multiplexers, and the rate processor employ a dynamic identity allocation arrangement for identifying a source of the messages such that messages originating from the encoders indicate whether the source is a primary or backup encoder and messages originating from the multiplexers include a character selected from among a predetermined sequence of characters that is incremented to the next character in the sequence each time one of the multiplexers transitions between an active and a backup state.

In accordance with one aspect of the invention, the encoders are MPEG encoders. In accordance with another aspect of the invention, the encoders are MPEG-2 encoders.

In accordance with another aspect of the invention, the bits streams received by the encoders include pre-compressed bit streams.

In accordance with another aspect of the invention, each of said bit streams comprise a channel incorporated in a broadcast over a broadband communications network.

In accordance with another aspect of the invention, the communications channel is a bidirectional Ethernet channel.

In accordance with another aspect of the invention, the messages originating from the backup encoder but not the primary encoders includes a flag.

In accordance with another aspect of the invention, if one of the multiplexers receives two messages identifying a given encoder but one message originates from a primary encoder and the other message originates from a backup encoder, the multiplexer disregards the message from the primary encoder.

In accordance with another aspect of the invention, the predetermined sequence of characters is a sequential numerical count.

In accordance with another aspect of the invention, the character selected from among the predetermined sequence of characters is a version number.

In accordance with another aspect of the invention, a given message is disregarded if it is received from one of the multiplexers having a lower version number than another message received from the other of the multiplexers that has a higher version number.

BRIEF DESCRIPTION OF THE DRAWINGS

FIG. 1 shows a conventional statistical multiplexer.
FIG. 2 illustrates one embodiment of a statistical multiplexer system in accordance with the present invention.

DETAILED DESCRIPTION

The present invention will be illustrated below using an exemplary statistical multiplexer suitable for use in video encoding applications. It should be understood, however, that the invention is more broadly applicable to any application which involves bandwidth allocation between multiple encoded bit streams. Furthermore, although particularly well-suited for use in MPEG-2 applications, the invention may be utilized with encoded bit streams generated using other encoding techniques FIG. 2 illustrates one embodiment of a statistical multiplexer system in accordance with the present invention. The inputs to the statistical multiplexer system 100 can include programs such as uncompressed digital video sequences. The uncompressed digital video sequences, e.g., programs 1-4, are encoded by encoders $120_1$-$120_4$, respectively, which use, for example, the MPEG video coding standard. Alternatively, one or more of the programs 1-4 may be pre-compressed bit streams, in which case the encoder to which it is directed serves as a transcoder. An encoder compresses a digital video sequence into a bit stream at a much lower rate while a transcoder converts a pre-compressed video bit stream into another bit stream at a new (low) rate. For simplicity, both encoders and transcoders will be referred to herein as encoders.

The transcoded data and encoded data are provided to a multiplexer 140 prior to being transmitted on a channel, typically to a decoder population. The channel may be part of a broadband communication network, such as a cable or satellite television network, for example. The program data may be provided from any source, such as a storage medium (e.g., magnetic tape or compact disc), or from a satellite transmission, for example. Pre-compressed data, such as for commercial insertion or insertion of local news or other programming, may be provided locally for use in conjunction with other data that is received from a remote source.

In operation, each MPEG encoder $120_1$-$120_4$ receives a target number of bits, $T_1$, $T_2$, $T_3$ and $T_4$, respectively, from a rate control processor 150 at each frame. The rate control processor 150 may perform various functions well-known to those of ordinary skill in the art such as frame level processing, super frame level processing, and complexity processing, for example. These processing functions may share common hardware such as memory and processing chips, or they may be distinct subsystems. Moreover, while the rate control processor 150 itself is shown as a distinct component, in some cases it may be incorporated directly into multiplexer 160.

The target number of bits for each frame of a program is met by adjusting the quantization parameter in the MPEG encoder or transcoder. The resulting number of compressed bits, R, as well as the average quantization parameter, Q, used for each frame are then sent to the rate control processor 150 as feedback data. Specifically, the encoders $120_1$-$120_4$ produce $R_1$, $R_2$, $R_3$ and $R_4$ bits, respectively, using quantization parameters $Q_1$, $Q_2$, $Q_3$ and $Q_4$, respectively. The rate control processor processor 150 calculates corresponding complexity values C using R and Q for each program. The rate control processor 150 then determines a new target number of bits for each new program frame or picture based on the program complexity.

Ideally, a statistical multiplexer system distributes the channel capacity over the input programs according to the programs' relative complexity measures. That is, more complex programs are assigned more bits, and less complex programs are assigned fewer bits. For a given rate, this also implies that the rate assigned for a program depends on the complexity measures of the program and the other programs. Since the program complexity may vary with time, the programs' relative complexity measures vary as well. The distribution of channel capacity, or bit allocation, over programs therefore has to be a time-varying function (e.g., on a frame-by-frame basis).

Once the target rate for a frame of a program is set, the next step is to achieve this rate, e.g., by adjusting the coding parameters, such as the quantization parameter, in the encoders and transcoders of the statistical multiplexer system. Any suitable rate control scheme may be used in connection with the encoders and transcoders.

Also shown in FIG. 2 are backup encoders $130_1$ and $130_2$ and backup multiplexer 140. Backup encoders $130_1$ and $130_2$ are available in the event that one of the primary encoders $120_1$-$120_4$ should fail. While two backup encoders are shown in the embodiment of the invention depicted in FIG. 2, those of ordinary skill in the art will recognize that any appropriate number of backup encoders may be employed. Generally, however, the number of backup encoders 130 is less than the number of primary encoders 120. On the other hand, multiplexer 140 will generally only have a single backup multiplexer 160. A switch or router 170 such as an SNMP controlled A/V router, for example, is provided to switch a program upon failure of one of the primary encoders $120_1$-$120_4$ to one of the backup encoders $130_1$-$130_2$.

Communication among the various encoders 120 and 130 and the multiplexers 140 and 160 can be accomplished in any conventional manner. For example, as indicated in FIG. 2, a bidirectional Ethernet connection may be provided for this purpose. Messages among the components may be transmitted in accordance with any desired protocol. Such messages generally include bandwidth allocation requests that are sent from the encoders to the multiplexer and bit rate information that is sent from the multiplexers to the encoders.

As previously mentioned, the use of dynamic identity allocation to identify the source of a message can be problematic for both the encoders and the multiplexers since a failed component can sometimes falsely transmit messages even after it has been replaced with a backup component that has come on line. In this way contending messages may be received by the other component or components. The present invention overcomes this problem in the following manner.

Since the number of backup encoders is generally less than the number of primary encoders, there are two distinct sets of encoders. That is, any given encoder is either a primary encoder or a backup encoder. The present inventors have recognized that the ambiguity that can arise with respect to the encoders in a dynamic identity allocation scheme can be overcome by including a flag or other indicator in the message protocol which indicates that a message originates from a backup encoder. In this way if the multiplexer receives two messages that have the same identifier, indicating that they originated from the same encoder, the multiplexer will be able to distinguish which message originated from the primary encoder and which message originated from the backup encoder.

It is reasonable to assume that a fault in a primary encoder is more likely to cause contending messages than a fault in a backup encoder. Accordingly, in the present invention, if the multiplexer receives two messages with the same encoder identity the multiplexer should recognize the message from the backup encoder and disregard any message from the primary encoder.

Since the number of primary and backup multiplexers are generally in a 1:1 redundant configuration, their roles as primary and backup components are interchangeable. For this reason the flag used by the encoders to distinguish between a primary and backup encoder is not a preferable means to distinguish between the multiplexers. Rather, the message protocol can be revised to include a version number in messages originating from a multiplexer. The version number is a serial count that is incremented by one whenever a multiplexer transitions from an active to a backup role. If a conflict arises because both multiplexers transmit a message, the encoders will only recognize the message with the higher version number. The multiplexers may be kept apprised of the current version number by any appropriate means over the Ethernet or other communications connection. For example, the backup multiplexer may receive the current version number of the active multiplexer from the encoder bandwidth request messages that it receives. While for purposes of illustration it has been assumed that the multiplexers are in a 1:1 redundant configuration in which the role of active and backup multiplexers are interchangeable, the aforementioned messaging arrangement is equally applicable to other configurations as well.

The invention claimed is:

1. A statistical multiplexer for multiplexing at least two bit streams each comprising video signals into a single multiplexed encoded bit stream, comprising:
   a plurality of primary encoders each receiving one of the bit streams and generating an encoded bit stream;
   at least one backup encoder that is activated and on-line in the event of a failure of one of the plurality of primary encoders, said backup encoder receiving the bit stream that would otherwise be directed to the failed primary encoder;
   at least two multiplexers such that at any given time one of the multiplexers is in an active state and the other is in a backup state, said multiplexer in the active state receiving each of the encoded bit streams from the encoders and generating a multiplexed encoded bit stream, said multiplexer in the backup state transitioning to the active state and receiving each of the encoded bit streams from the encoders in the event of a failure in the other multiplexer;
   a rate processor for adjusting a distribution of bit rate allocation among the plurality of primary encoders;
   a communications channel operatively associated with the encoders, the multiplexers and the rate processor, said communication channel supporting messages among and between the encoders, the multiplexers and the rate processor; and
   wherein the encoders, the multiplexers, and the rate processor employ a dynamic identity allocation arrangement for identifying a source of the messages such that messages originating from the encoders indicate whether the source is a primary or backup encoder and messages originating from the multiplexers include a character selected from among a predetermined sequence of characters that is incremented to the next character in the sequence each time one of the multiplexers transitions between an active and a backup state.

2. The statistical multiplexer of claim 1 wherein said encoders are MPEG encoders.

3. The statistical multiplexer of claim 1 wherein said encoders are MPEG-2 encoders.

4. The statistical multiplexer of claim 1 wherein said bits streams received by the encoders include pre-compressed bit streams.

5. The statistical multiplexer of claim 1 wherein each of said bit streams comprise a channel incorporated in a broadcast over a broadband communications network.

6. The statistical multiplexer of claim 1 wherein said communications channel is a bidirectional Ethernet channel.

7. The statistical multiplexer of claim 1 wherein said messages originating from the backup encoder but not the primary encoders includes a flag.

8. The statistical multiplexer of claim 1 wherein if one of said multiplexers receives two messages identifying a given encoder but one message originates from a primary encoder and the other message originates from a backup encoder, said multiplexer disregards the message from the primary encoder.

9. The statistical multiplexer of claim 1 wherein said predetermined sequence of characters is a sequential numerical count.

10. The statistical multiplexer of claim 1 wherein said character selected from among the predetermined sequence of characters is a version number.

11. The statistical multiplexer of claim 10 wherein a given message is disregarded if it is received from one of the multiplexers having a lower version number than another message received from the other of the multiplexers that has a higher version number.

12. A method for multiplexing at least two bit streams each comprising video signals into a single multiplexed encoded bit stream, said method comprising the steps of comprising:
   encoding a plurality of bit streams with a plurality of primary encoders, or, in event of a failure of one of the primary encoders, with a remaining primary encoder and a backup encoder;
   multiplexing the plurality of encoded bit streams with one of a plurality of multiplexers such that at any given time one of the multiplexers is in an active state and the other is in a backup state;
   adjusting a distribution of bit rate allocation among the plurality of primary encoders; and
   transmitting messages among at least the encoders and the multiplexers using a dynamic identity allocation arrangement for identifying a source of the messages such that messages originating from the encoders indicate whether the source is a primary or backup encoder and messages originating from the multiplexers include a character selected from among a predetermined sequence of characters that is incremented to the next character in the sequence each time one of the multiplexers transitions between an active and a backup state.

13. The method of claim 12 wherein said encoders are MPEG encoders.

14. The method of claim 12 wherein said encoders are MPEG-2 encoders.

15. The method of claim 12 wherein said bits streams received by the encoders include pre-compressed bit streams.

16. The method of claim 12 wherein each of said bit streams comprise a channel incorporated in a broadcast over a broadband communications network.

17. The method of claim 12 wherein said messages are transmitted over a bidirectional Ethernet channel.

18. The method of claim 12 wherein said messages originating from the backup encoder but not the primary encoders includes a flag.

19. The method of claim 12 wherein if one of said multiplexers receives two messages identifying a given encoder but one message originates from a primary encoder and the other message originates from a backup encoder, said multiplexer disregards the message from the primary encoder.

20. The method of claim 12 wherein said predetermined sequence of characters is a sequential numerical count.

21. The method of claim 12 wherein said character selected from among the predetermined sequence of characters is a version number.

22. The method of claim 21 wherein a given message is disregarded if it is received from one of the multiplexers having a lower version number than another message received from the other of the multiplexers that has a higher version number.

23. A statistical multiplexer for multiplexing at least two bit streams each comprising video signals into a single multiplexed encoded bit stream, comprising:
   a plurality of primary encoders each receiving one of the bit streams and generating an encoded bit stream;
   at least one backup encoder that is activated and on-line in the event of a failure of one of the plurality of primary encoders, said backup encoder receiving the bit stream that would otherwise be directed to the failed primary encoder;
   at least two multiplexers such that at any given time one of the multiplexers is in an active state and the other is in a backup state, said multiplexer in the active state receiving each of the encoded bit streams from the encoders and generating a multiplexed encoded bit stream, said multiplexer in the backup state transitioning to the active state and receiving each of the encoded bit streams from the encoders in the event of a failure in the other multiplexer;
   a rate processor for adjusting a distribution of bit rate allocation among the plurality of primary encoders;
   a communications channel operatively associated with the encoders, the multiplexers and the rate processor, said communication channel supporting messages among and between the encoders, the multiplexers and the rate processor; and
   wherein the encoders, the multiplexers, and the rate processor employ a dynamic identity allocation arrangement for identifying a source of the messages such that messages originating from the encoders indicate whether the source is a primary or backup encoder and messages originating from the multiplexers include a character selected from among a predetermined sequence of characters that is incremented to the next character in the sequence each time one of the multiplexers transitions between an active and a backup state, wherein said character selected from among the predetermined sequence of characters is a version number and wherein a given message is disregarded if it is received from one of the multiplexers having a lower version number than another message received from the other of the multiplexers that has a higher version number.

* * * * *